United States Patent [19]

Denecker et al.

[11] 4,292,043

[45] Sep. 29, 1981

[54] PROCESS FOR WORKING UP EFFLUENT CONTAINING AMMONIUM SULPHATE

[75] Inventors: Gabriël Denecker, Heide-Kalmthout; Domien Sluyts, Stabroek; Roland Putseys, Heide-Kalmthout; Willy Van Herck; Ludo Claes, both of Braschaat, all of Belgium; Georg Spott, Krefeld, Fed. Rep. of Germany

[73] Assignee: Bayer Antwerpen, Antwerp, Belgium

[21] Appl. No.: 113,893

[22] Filed: Jan. 21, 1980

[30] Foreign Application Priority Data

Feb. 15, 1979 [DE] Fed. Rep. of Germany ....... 2905779
Sep. 7, 1979 [DE] Fed. Rep. of Germany ....... 2936153

[51] Int. Cl.$^3$ .......................... B01D 9/02; C01C 1/24
[52] U.S. Cl. ....................................... 23/296; 23/300; 23/302 A; 260/239.3 A; 423/545
[58] Field of Search ................. 23/296, 302 R, 302 A, 23/295 R, 300; 423/545; 260/239.3 A

[56] References Cited

U.S. PATENT DOCUMENTS

| | | | |
|---|---|---|---|
| 2,623,814 | 12/1952 | Gray | 23/302 A X |
| 3,884,644 | 5/1975 | Bonnema et al. | 23/302 A X |
| 4,015,946 | 4/1977 | Bonnema et al. | 23/302 A X |

FOREIGN PATENT DOCUMENTS

| | | |
|---|---|---|
| 675075 | 1/1966 | France . |
| 6805152 | 10/1969 | Netherlands . |
| 1158998 | 7/1969 | United Kingdom . |
| 1160580 | 8/1969 | United Kingdom . |

*Primary Examiner*—Bradley Garris
*Attorney, Agent, or Firm*—Sprung, Felfe, Horn, Lynch & Kramer

[57] ABSTRACT

A process for the working up of ammonium sulphate-containing effluent which is contaminated with organic compounds and optionally also ammonium nitrate, comprising evaporating the effluent to produce water vapor which is removed, a concentrated liquid and a crystal suspension, thickening the suspension to obtain solid ammonium sulphate which is removed and liquid which is recycled to an earlier stage, subjecting the concentrated liquid from evaporation to an optional vacuum cooling crystallization to obtain water vapor which is removed and a crystal suspension from which a concentrated liquid is separated off, advancing the concentrated liquid from the evaporation stage or from the vacuum cooling crystallization stage to a crystallizer, introducing ammonia into the crystallizer to decrease the solubility of the ammonium sulphate, thickening the ammoniacal crystal suspension to obtain ammonium sulphate solids which are removed and ammoniacal mother liquor which is advanced to a distillation step for recovery of ammonia.

11 Claims, 1 Drawing Figure

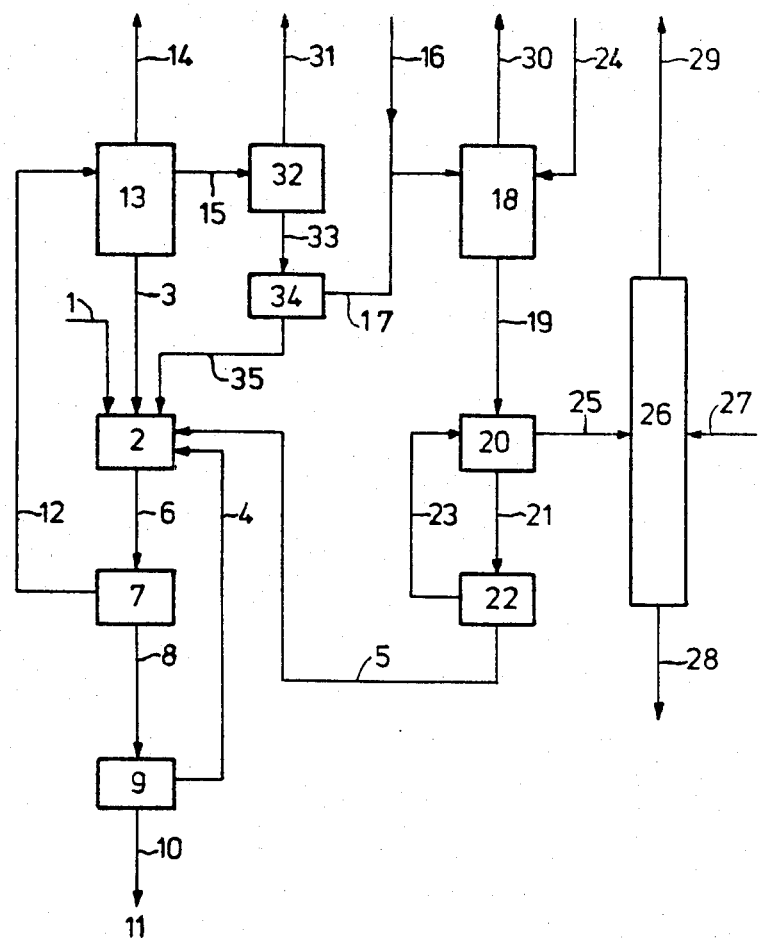

PROCESS FOR WORKING UP EFFLUENT CONTAINING AMMONIUM SULPHATE

This invention relates to the working up of effluent containing ammonium sulphate, in particular the working up of aqueous ammonium sulphate-containing effluent which is contaminated with organic compounds and optionally also with ammonium nitrate, such as the effluent resulting, for example, from the production of $\epsilon$-caprolactam.

In the large scale industrial production of $\epsilon$-caprolactam from cyclohexanone and hydroxylammonium salts by the known Beckmann rearrangement, an aqueous solution containing up to about 4.5 parts by weight of ammonium sulphate to each part by weight of caprolactam, depending on the particular process employed, is obtained. After removal of the caprolactam from this solution, crystalline ammonium sulphate is obtained by evaporation of the water, and is used as fertilizer. The apparatus used for this evaporation crystallization is designed as a multi-stage apparatus in which the ammonium sulphate-containing aqueous solution which is to be concentrated and the steam or vapor used for heating are brought into contact in counter-current with each other through the heat exchangers of the individual stages so as to make economic use of the thermal energy put into the process.

The aqueous ammonium sulphate-containing solution may also contain small quantities of ammonium nitrate resulting from the formation of hydroxylamine. It also contains organic intermediate and by-products from the various stages of $\epsilon$-caprolactam production. If this effluent is completely evaporated, the fertilizer salts obtained are heavily contaminated and cannot be used. It is known that the concentration of ammonium nitrate and dissolved organic compounds which takes place when the water is evaporated may result in explosive oxidation and decomposition reactions, particularly if the ammonium nitrate concentrations are relatively high and the pH values are in the acid range. This is one reason why the recovery of ammonium sulphate by evaporation crystallization from ammonium nitrate-containing effluent resulting from $\epsilon$-caprolactam production could hitherto only be achieved with a yield of up to about 95%.

It is an object of the present invention to provide a simple, reliable and economically viable process suitable for application on a large industrial scale for the working up of contaminated effluent containing ammonium sulphate of the type resulting, for example, from the production of $\epsilon$-caprolactam.

The present invention is thus a process for the working up of ammonium sulphate-containing effluent which is contaminated with organic compounds and optionally also ammonium nitrate, characterized in that the effluent is concentrated optionally in several stages, accompanied by the removal of ammonium sulphate, the residual mother liquor discharged from the final evaporation stage is optionally subjected to a vacuum cooling crystallization at about 10° to about 80° C., the ammonium sulphate obtained is separated off and preferably returned to the evaporation crystallization, the concentrated mother liquor containing ammonium sulphate is rediluted with water, ammonia is then introduced into the resulting solution at a pressure of up to about 5 kg/cm², the ammonium sulphate which crystallizes is separated from the ammoniacal mother liquor and optionally washed free from ammonia and returned, preferably into the process of evaporation crystallization, and the ammonia is then recovered from the ammoniacal mother liquor by distillation.

If the effluent which is to be worked up contains ammonium nitrate, it is first concentrated by evaporation crystallization, optionally in several stages, to ammonium nitrate concentrations of about 6 to about 14% by weight, preferably about 8 to 12% by weight, this process of concentration being accompanied by removal of the crystalline ammonium sulphate.

It has been found that colorless coarse-grained ammonium sulphate which can be scattered is obtained in a surprisingly high degree of purity and in yields of up to 99.8% from ammonium sulphate-containing effluent contaminated with organic compounds and optionally also with ammonium nitrate, such as the effluent resulting, for example, from $\epsilon$-caprolactam synthesis, if such effluent is first concentrated by evaporation to ammonium nitrate concentrations, if present, up to about 6 to about 14% by weight, preferably about 8 to about 12% by weight, optionally in several stages, and the hot, concentrated ammonium sulphate solution which results when the coarse-grained ammonium sulphate is separated off, and which is contaminated with organic compounds and optionally also ammonium nitrate, is subsequently subjected to a precipitation crystallization and the precipitated ammonium sulphate at the same time returned to the stage of concentration by evaporation. The residual mother liquor discharged from the final stage of evaporation is optionally subjected to a vacuum cooling crystallization at 10° to 80° C., preferably about 35° to 60° C., and the ammonium sulphate formed is separated off and preferably returned to the evaporation crystallization. Dilution with water is carried out before the precipitation crystallization, optionally after a vacuum cooling crystallization. Ammonia is added to the resulting solution at a pressure of up to about 5 kg/cm², preferably about 1 to 2 kg/cm², the ammonium sulphate which has crystallized out is separated from the ammoniacal mother liquor, optionally washed free from ammonia and preferably returned to the evaporation crystallization stage and the ammonia is then recovered from the ammoniacal mother liquor by distillation.

To carry out the precipitation crystallization, the concentrated, hot ammonium sulphate solution obtained from the evaporation crystallization or from an optionally following vacuum cooling crystallization is first rediluted with water or with a condensate of vapors, e.g. the vapors obtained from evaporation crystallization, to a concentration at which it is saturated or nearly saturated at 0° to about 50° C., preferably about 10° to about 35° C.

Ammonia is then added to this ammonium sulphate solution at a temperature of 0° to about 50° C., preferably about 10° to 35° C., and at a pressure of up to about 5 kg/cm², preferably 1 to 2 kg/cm². The ammonium sulphate precipitated at this stage is separated from the ammoniacal mother liquor of crystallization and then dissolved or suspended in the diluted ammonium sulphate-containing effluent of $\epsilon$-caprolactam production and returned to the evaporation crystallization stage. The combination according to the invention of these stages of the process surprisingly results in a highly pure, loosely scattering fertilizer salt with an average particle diameter of at least 1 mm, in spite of the high concentration of organic impurities present at the stage of precipitation crystallization and in spite of the fact that up to 99.8% of the ammonium sulphate has been recovered.

At least two streams of effluent are formed in the production of ϵ-caprolactam. Both contain ammonium sulphate and are contaminated to a greater or less degree with organic compounds. The effluent from the stage of oximation in most cases also contains ammonium nitrate. In the process according to the invention, the two streams of effluent may be worked up either separately or together. They are preferably mixed and then worked up together by the process according to the invention.

This, however, applies only to effluent resulting, for example, from the production of ϵ-caprolactam. If, for example, it is required to work up an effluent which contains ammonium sulphate but is free from nitrate and contains organic compounds, e.g. an effluent from the production of acrylic compounds, this can also be achieved with the present process, as already mentioned above.

The process according to the invention is preferably carried out continuously but at least parts of the process, e.g. the precipitation of ammonium sulphate with ammonia, may, of course, be carried out step-wise.

The ammonia required for the precipitation crystallization may be added in the gaseous state and/or as highly concentrated ammoniacal water and/or in a liquid form. It is preferably added in the liquid form. The precipitated ammonium sulphate is largely separated from the ammoniacal mother liquor and optionally washed free from ammonia. The ammonia used for precipitation is recovered from this mother liquor in a suitable distillation apparatus and may be returned to the precipitation crystallization. According to the process of invention the recovery of ammonia used as precipitating agent requires only a very slight consumption of energy.

The ammonia contained in the ammonium salts left in the mother liquor after the precipitation crystallization can be recovered from the ammonium salts after a treatment with alkali or earth alkali metal base such as sodium hydroxide solution, potassium hydroxide solution, calcium oxide or milk of lime. The residual effluent still charged with organic compounds but containing little salt may be subjected, for example, to a biological effluent treatment.

One embodiment of the present invention will now be described with reference to the drawing which is a flow sheet of the process. The reference numerals used in the figure have the following meaning:

| | |
|---|---|
| 1,4,12,15,16,17,23,25,27,28: | pipes for liquids |
| 3,6,8,19,21,33,35: | pipes for suspensions |
| 5,10: | pipes for moist salt |
| 14,31: | pipes for vapor |
| 24,29,30: | ammonia pipes |
| 2: | stirrer vessel |
| 7,20,34 | thickening apparatus |
| 9,22 | centrifuges |
| 11: | drying installation |
| 13: | evaporation crystallization apparatus |
| 18: | precipitation crystallization apparatus |
| 32: | vacuum cooling crystallization apparatus |
| 26: | distillation plant. |

The details of the process carried out according to this embodiment are as follows:

The ammonium sulphate-containing effluent 1 from the production of ϵ-caprolactam, the ammonium sulphate suspension 3 from the evaporation crystallization apparatus 13, the mother liquor 4 separated in the centrifuge 9, the suspension 35 discharged from the thickener apparatus 34, and solid ammonium sulphate 5 which was precipitated with ammonia and has been largely freed from ammoniacal mother liquor 23 by the centrifuge 22 are mixed together in a stirrer vessel 2. The resulting crystal suspension 6 is concentrated in a thickener vessel 7 and obtained as a crystal slurry 8 which is separated into a mother liquor 4 and moist salt 10. The salt 10 is transferred to a drying plant 11.

The overflow 12 from the thickener 7, which is saturated with ammonium sulphate, is concentrated in known manner in an evaporation-crystallization apparatus 13. A residual liquor 15 saturated with ammonium sulphate and organic compounds is obtained in addition to a crystal suspension 3 and vapors 14. This residual liquor 15 is optionally subjected to a vacuum cooling crystallization in an apparatus 32 from which the vapors 31 are withdrawn and the suspension is transferred to the thickener 34 through a pipe 33. The dilution with water 16 may be carried out behind the cooling crystallization 32 respectively before the precipitation crystallization 18.

Liquid ammonia 24 is added to the ammonium sulphate solution 17 in a precipitation crystallizer 18 and the resulting crystal slurry 19 is thickened in an apparatus 20 and separated in an apparatus 22 into solid ammonium sulphate 5 and mother liquor 23. The overflow 25 from the thickener 20 is transferred to a single stage or two-stage distillation plant 25 for recovery of the ammonia. Alkaline compounds 27 are added to recover the ammonia still bound in the remaining ammonium salts. A stream of ammonia 29 and an effluent 28 which is free from both ammonia and ammonium salts are obtained. Owing to its largely reduced charge of salts, stream 28 may now be subjected to a biological effluent treatment for decomposition of the dissolved organic compounds and optionally of the nitrates.

The process according to the invention will now be further described by way of example. It will be apparent to those skilled in the art that the following examples are set forth by way of illustration and not limitation, and that various modifications and changes may be made without departing from the true spirit and scope of the present invention.

EXAMPLE 1

7,200 kg per hour of effluent from ϵ-caprolactam production (36.8% by weight in ammonium sulphate; 0.4% by weight in ammonium nitrate) together with mother liquor which has been freed from ammonium sulphate crystals by the centrifuges of the evaporation crystallization stage and ammonium sulphate which has been separated from the ammoniacal mother liquor by the centrifuge of the precipitation crystallization stage are introduced into a stirrer vessel into which the salt slurry from the evaporation crystallization stage also flows. The resulting crystal suspension obtained in this stirrer vessel is thickened and then freed from mother liquor by centrifuging. A total of 4,370 kg per hour of vapor is formed by concentration of the liquid overflowing from the thickener, and 2,641 kg per hour of coarsely crystalline, colorless ammonium sulphate (average particle diameter: 1.1 mm; nitrogen content about 21% by weight) is obtained in 99.7% of the theoretical yield after drying of the moist fertilizer salt. A residual liquor having the following composition is discharged from the evaporation crystallization apparatus at the rate of 310 kg per hour; ammonium sulphate, 41.8% by weight; ammonium nitrate, 9.3% by weight. This liquor is immediately diluted with vapor condensate to form a 36.0% by weight ammonium sulphate solution and is then cooled to 30° C.

209 kg per hour of liquid ammonia are added to this ammonium sulphate-containing solution to produce a 33% ammonia solution at normal pressure, and 121 kg per hour of crystalline ammonium sulphate are precipitated at the same time. The temperature is maintained at 15° C. by evaporation cooling. The precipitation ammonium sulphate is thickened and then largely separated from ammoniacal mother liquor, and returned to the above mentioned stirrer vessel. After distillation of the ammoniacal mother liquor, the recovered gaseous ammonia is liquefied together with the gas evaporated from the precipitation crystallizer and used again for precipitation of the ammonium sulphate. When 33 kg per hour of a 25% ammoniacal water are recovered by distillation from the bottom product of a first distillation column, which has been made alkaline with 42 kg per hour of 50% sodium hydroxide solution, effluent having the following composition is obtained at the rate of 248 kg per hour: sodium sulphate, 3.8% by weight; sodium nitrate, 12.3% by weight.

EXAMPLE 2

The hot residual liquor discharged from the evaporation crystallization in Example 1 is subjected to a vacuum cooling crystallization. 19 kg per hour of vapor are removed and a crystal suspension is obtained at the same time. This suspension is also returned to the aforesaid stirrer vessel after ithas been thickened to a salt slurry having a concentration of about 50% by weight (68 kg per hour). The suspension obtained in the stirrer vessel is thickened and then separated into mother liquor and moist fertilizer salt by centrifuging. After drying, 2.644 kg per hour of coarse-grained, colorless ammonium sulphate (99.8% of the theoretical yield) are obtained.

257 kg per hour of mother liquor having the following composition are removed from the thickener of the vacuum cooling crystallization stage: ammonium sulphate, 37.2% by weight; ammonium nitrate, 11.2% by weight. This mother liquor is immediately diluted with vapor condensate to form a 35.5% by weight ammonium sulphate solution which is then cooled to 30° C. 159 kg per hour of liquid ammonia are added to this solution to form a 33% ammonia solution at normal pressure, 90 kg per hour of ammonium sulphate salt being precipitated at the same time. The temperature is maintained at 15° C. by evaporation of ammonia. The precipitated ammonium sulphate is thickened and then largely separated from mother liquor which is saturated with ammonia, and it is then used again in the aforesaid stirrer vessel. Gaseous ammonia is recovered from the ammoniacal mother liquor by the addition of 38 kg per hour of a 50% sodium hydroxide solution and is liquefied together with the gas produced by evaporation in the precipitation stage. The liquefied gas is used again for precipitation of the ammonium sulphate. 209 kg per hour of effluent having the following salt content are obtained: sodium sulphate, 2.9% by weight; sodium nitrate, 14.6% by weight.

What is claimed is:

1. A process for the working up of ammonium sulphate-containing effluent which is contaminated with organic compounds, comprising the steps of evaporating and crystallizing the effluent to produce water vapor which is removed, a concentrated liquid and a crystal suspension, thickening the suspension to obtain solid ammonium sulphate which is removed and liquid which is recycled to an earlier step, advancing the concentrated liquid to a crystallizer, introducing ammonia into the crystallizer to decrease the solubility of the ammonium sulphate, thickening the resulting ammoniacal crystal suspension to obtain ammonium sulphate solids which are removed and ammoniacal liquor which is advanced to a distillation step for recovery of ammonia.

2. A process according to claim 1, wherein the effluent contains ammonium nitrate which is concentrated in the evaporating and crystallizing step to ammonium nitrate concentrations of about 6 to about 14 percent by weight.

3. A process according to claim 1 or 2, wherein the concentrated liquid from the evaporating and crystallizing step is first subjected to a vacuum cooling crystallization step at about 10° to 80° C. to obtain water vapor which is removed and a crystal suspension from which a concentrated liquid is separated off and then advanced to the crystallizer.

4. A process according to claim 1, wherein water is added to the concentrated liquid being advanced to the crystallizer to obtain an ammonium sulphate concentration at which the resulting solution is saturated or nearly saturated at 0° to about 50° C.

5. A process according to claim 1, wherein said ammonia is introduced in the gaseous state and/or as a highly concentrated ammoniacal water and/or in the liquid form.

6. A process according to claim 1, wherein said ammonia is introduced at a pressure of up to about 5 kg/cm$^2$ and at a temperature from 0° to about 50° C. to obtain a crystal suspension with an ammonia concentration up to the saturation.

7. A process according to claim 1, wherein the temperature of the crystallizer is controlled by introducing ammonia in the liquid form and/or as a highly concentrated ammoniacal water in an amount which is an excess over that theoretically required to saturate with ammonia.

8. A process according to claim 1, wherein the crystalline ammonium sulphate obtained in the crystallizer is recycled to the evaporating and crystallizing step.

9. A process according to claim 3, wherein the crystalline ammonium sulphate obtained in the vacuum cooling crystallization step is recycled to the evaporating and crystallizing step.

10. A process according to claim 1, wherein the ammonia contained in the ammonium salts left in the ammoniacal liquor as dissolved ammonium salts is recovered by adding alkali or earth alkali metal base to the liquid being distilled, leaving an effluent which is free both from ammonia and ammonium salts.

11. A process according to claim 1, wherein the evaporating and crystallizing of the ammonium sulphate-containing effluent is carried out in a multistage crystallization apparatus.

* * * * *